United States Patent
Zhou et al.

(10) Patent No.: US 10,947,401 B2
(45) Date of Patent: Mar. 16, 2021

(54) LIQUID INK CONTAINING A HYDANTOIN CO-SOLVENT

(71) Applicant: Hewlett-Packard Development Company, L.P., Houston, TX (US)

(72) Inventors: Zhang-Lin Zhou, San Diego, CA (US); Benjamin Abelovski, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 121 days.

(21) Appl. No.: 16/311,579

(22) PCT Filed: Oct. 17, 2016

(86) PCT No.: PCT/US2016/057376
§ 371 (c)(1),
(2) Date: Dec. 19, 2018

(87) PCT Pub. No.: WO2018/075003
PCT Pub. Date: Apr. 26, 2018

(65) Prior Publication Data
US 2019/0233666 A1 Aug. 1, 2019

(51) Int. Cl.
*C09D 11/033* (2014.01)
*C09D 11/107* (2014.01)
(Continued)

(52) U.S. Cl.
CPC .......... *C09D 11/322* (2013.01); *C09D 11/033* (2013.01); *C09D 11/037* (2013.01); *C09D 11/102* (2013.01); *C09D 11/38* (2013.01)

(58) Field of Classification Search
CPC .................... C09D 11/033; C09D 11/107
See application file for complete search history.

(56) References Cited

U.S. PATENT DOCUMENTS 6,827,769 B2   12/2004   Auslander et al.
6,908,185 B2    6/2005   Chen et al.
(Continued)

FOREIGN PATENT DOCUMENTS

JP    2013159725           8/2013
WO   WO-0170892 A1 *  9/2001   .............. C09D 11/10
(Continued)

OTHER PUBLICATIONS

SciFinder Search (Dec. 23, 2019).*
International Search Report and Written Opinion for International Application No. PCT/US2016/057376 dated Aug. 14, 2017, 6 pages.

*Primary Examiner* — Vu A Nguyen
(74) *Attorney, Agent, or Firm* — Dierker & Kavanaugh PC

(57) ABSTRACT

An example of a liquid ink includes a colorant, a co-solvent, and a balance of water. The co-solvent includes a hydantoin having a general formula (I) or a general formula (II) wherein n is an integer greater than 2 and m is an integer equal to or greater than 2.

(I)

(Continued)

-continued

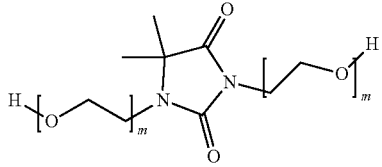

(II)

10 Claims, 1 Drawing Sheet

(51) Int. Cl.
*C09D 11/322* (2014.01)
*C09D 11/38* (2014.01)
*C09D 11/037* (2014.01)
*C09D 11/102* (2014.01)

(56) References Cited

U.S. PATENT DOCUMENTS

| | | | |
|---|---|---|---|
| 7,425,592 B2 | 9/2008 | Higashiyama et al. | |
| 8,328,317 B1 | 12/2012 | Yee | |
| 8,492,456 B2 * | 7/2013 | Chen | C09D 11/30 106/31.6 |
| 8,721,781 B2 | 5/2014 | Koganehira et al. | |
| 8,939,568 B2 * | 1/2015 | Stoeva | C08G 18/5015 347/100 |
| 2012/0227620 A1 | 9/2012 | Koganehira et al. | |

FOREIGN PATENT DOCUMENTS

| | | |
|---|---|---|
| WO | WO-2006099551 | 9/2006 |
| WO | WO-2007112244 | 10/2007 |
| WO | WO-2013095497 | 6/2013 |

* cited by examiner

LIQUID INK CONTAINING A HYDANTOIN CO-SOLVENT

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components.

DETAILED DESCRIPTION

Figure 1:
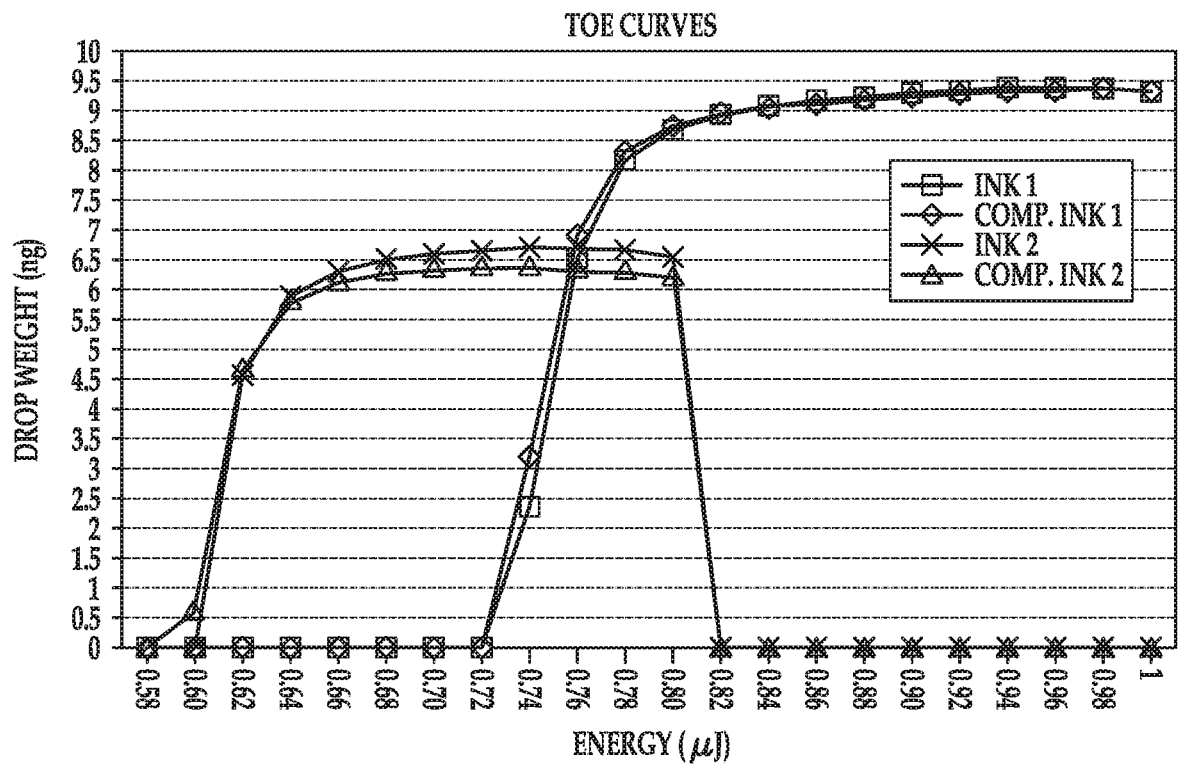
FIG. 1 is a Turn On Energy (TOE) graph illustrating the effect of increasing electrical energy (μJ, X axis) on ink drop weight (ng, Y axis) for examples of the liquid ink disclosed herein and comparative inks.

In thermal inkjet printing, co-solvent(s) may be added to water-based inkjet ink to help stabilize the other components of the ink and to enable good printhead jettability and reliability performance (e.g., good decap, drop weight, kogation performance, etc.). 1,3-bis(2-hydroxyethyl)-5,5-dimethylhydantoin (sold under the tradename DANTOCOL® DHE) has been used as a co-solvent in water-based inkjet inks because it has high water solubility, low-VOC (volatile organic compound) content, and good jettability performance. However, 1,3-bis(2-hydroxyethyl)-5,5-dimethylhydantoin is difficult to produce and expensive to purchase.

Disclosed herein is a liquid ink, which includes a hydantoin co-solvent. The hydantoin has a general formula I:

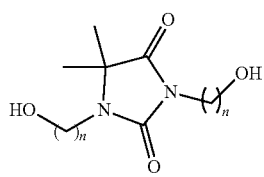

(I)

or a general formula II:

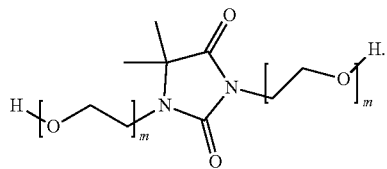

(II)

In some examples, n is an integer greater than 2 and m is an integer equal to or greater than 2. In other examples (e.g., when a saccharide is excluded or the ink consists of the listed components), n is an integer equal to 1 or greater than 2 and m is an integer equal to or greater than 2. Examples of the liquid ink, which include the hydantoin, exhibit several desirable characteristics, some of which are good or improved image quality performance, durability performance, jettability performance, and stability performance. Additionally, the hydantoin disclosed herein may be easier to produce and less expensive to purchase than 1,3-bis(2-hydroxyethyl)-5,5-dimethylhydantoin.

Image quality performance may be measured in terms of the optical density, coalescence, and gloss of a printed image. The term "optical density," as referred to herein, means the ability of a printed image to retard light rays. A higher optical density equates to better image quality performance. The term "coalescence," as used to herein, refers to the phenomenon of separately deposited drops of ink combining together. Coalescence can lead to blurring of the printed image and therefore, to poor image quality performance. The term "gloss," as referred to herein, means the shine or luster of a printed image. A higher gloss is indicative of good image quality performance.

Durability performance may be measured in terms of the mechability and abrasion resistance of a printed image. The term "mechability," as referred to herein, is a form of durability, and means the ability of a printed image to remain undamaged when rubbed immediately after printing. Printers may contain media rollers, which may pass over images shortly after they are printed (e.g., within a few seconds). The stress applied to the printed image by the media rollers, which may be at elevated temperatures, may damage the image by changing its gloss, optical density, or film uniformity. The media rollers may also damage the printed image by removing pieces of the ink film and/or exposing bare media. A mechability test may simulate these post-printing conditions and determine if the printed image is durable enough to withstand the stress that may be applied by the media rollers. The term "abrasion resistance," as referred to herein means the ability of a printed image to remain undamaged when rubbed. High abrasion resistance can lead to good durability performance.

Jettability performance can be measured in terms of decap performance, missing nozzle percentage, drop weight, and drop velocity. The term "decap performance," as referred to herein, means the ability of the inkjet ink to readily eject from the printhead, upon prolonged exposure to air. The decap time is measured as the amount of time that a printhead may be left uncapped (i.e., exposed to air) before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. A decreased decap time can lead to poor jettability performance.

The term "missing nozzle percentage," as used herein, refers to the percentage of nozzles that do not fire. Missing nozzle percentage can be measured after storage or during other jettability performance testing. For example, missing nozzle percentage may be measured during drop velocity testing. A high missing nozzle percentage can lead to poor jettability performance.

The term "drop weight," as used herein refers to the weight of the individual drops of ink. Drop weight can be measured by firing a known number of ink drops into a weighing pan that can be used to calculate the theoretical average drop weight. A steady-state drop weight (i.e., calculated by averaging the drop weights measured at a series of low ejection frequencies) and a high frequency drop weight (i.e., measured at a high ejection frequency) can be measured. A drop weight within a set range can lead to good jettability performance. For example, from about 8.5 ng to about 9.5 ng is a good range for drop weight for an ink containing a black pigment, and from about 5.5 ng to about 6.5 ng is a good range for drop weight for an ink containing a cyan pigment. The term "drop velocity," as used herein refers to the velocity of the individual drops of ink. Drop velocity can be measured by using lasers to track the movement of ink drops as they are jetted through the air from the printhead. A drop velocity within a set range can lead to good jettability performance. For example, from about 10 m/s to about 12 m/s is a good range for drop velocity.

Stability performance can be measured in terms of pH stability and physical stability. The term "pH stability," as referred to herein, means the ability of the ink to maintain a substantially unchanged pH over time (e.g., within ±0.1 of the original pH). The term "physical stability," as referred to herein, means the ability of the colorant particles in the inkjet ink to remain substantially unchanged over time. To determine the physical stability of an ink, the change in particle size may be measured over time, and the percentage of size change may be determined. The particle size may be considered to be "substantially unchanged over time" when the percentage of size change is 10% or less. Particle size may be measured using dynamic light scattering.

To facilitate the measurement of the pH change and the particle size percentage change, the ink formulations may be stored in an accelerated storage (AS) environment. The pH and particle size may be measured before and after the ink formulations have been stored in the AS environment. The accelerated storage environment may be an environment that has a temperature ranging from about 45° C. to about 60° C. In an example, the accelerated storage environment is an oven baked at a temperature of about 60° C. and the ink formulations are stored in the AS environment for about one week.

An additional way to facilitate the measurement of the pH change and the particle size percentage change is to subject the ink formulations to a Temperature-cycle (T-cycle). A T-cycle test may indicate an instability in the ink formulations that is not indicated by an AS environment test. Conversely, an AS environment test may indicate an instability in the ink formulations that is not indicated by a T-cycle test. A stable ink formulation should be able pass both an AS environment test and a T-cycle test. When conducting a T-cycle test, the pH and particle size may be measured before and after the ink formulations have undergone the T-cycle. The T-cycle may involve heating the ink formulation to a high temperature and maintaining the ink formulation at the high temperature for a few minutes, and then cooling the ink formulation to a low temperature and maintaining the ink formulation at the low temperature for a few minutes. The process may be repeated for a number of cycles (e.g., 5).

A large pH change or a large particle size change can lead to a short shelf life of the ink formulation. As one example, a large particle size change may result from phase separation in the bulk ink (e.g., pigments separating from the vehicle, agglomerating with one another, and/or settling), which would cause the ink to be unusable. A large pH change or a large particle size change may also alter the jettability performance and/or the image quality performance. As previously mentioned, pigment agglomeration and/or settling may render the ink more difficult to jet. As another example, a large pH change can cause a large change in ink viscosity. If the pH decreases too much, the viscosity of the ink may increase, which renders the ink susceptible to faster hardening, which can clog printhead nozzles.

The liquid ink disclosed herein, which includes the hydantoin disclosed herein, may be included in a single cartridge set or a multiple-cartridge set. In the multiple-cartridge set, any number of the multiple inks may have the hydantoin incorporated therein. As used herein, the terms "liquid ink" "ink(s)" and "ink composition" refer to an ink formulation that is liquid and that includes the hydantoin.

As used herein, the term "hydantoin" refers to a chemical having general formula I:

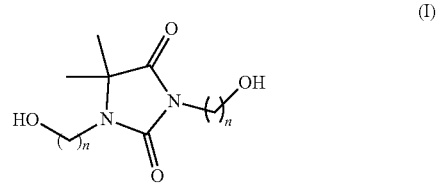

or general formula II:

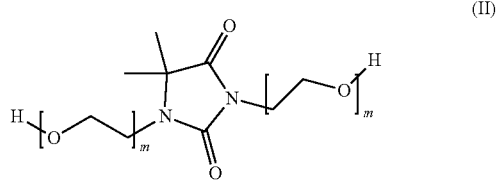

where n is an integer equal to 1 or greater than 2 and m is an integer equal to or greater than 2.

In an example, the liquid ink disclosed herein includes a colorant, the hydantoin co-solvent disclosed herein, and a balance of water. In some examples, the liquid ink consists of these components, with no other components. In other examples, the liquid ink consists of these components, as well as a binder (e.g., a polyurethane binder), a surfactant, and an additive selected from the group consisting of an antimicrobial agent, a sequestering agent, a viscosity modifier, an anti-kogation agent, and combinations thereof. Suitable amounts for the components of these examples of the liquid ink are discussed further hereinbelow.

In another example, the liquid ink disclosed herein includes the colorant, the hydantoin co-solvent of formula (I) i where n is an integer greater than 2 or of formula (II)

where m is an integer equal to or greater than 2, and the balance of water. In other examples, the liquid ink includes these components and an additional component, such as a binder (e.g., a polyurethane binder). In yet further examples, the liquid ink includes the colorant, the hydantoin co-solvent of formula (I) i where n is an integer greater than 2 or of formula (II) where m is an integer equal to or greater than 2, the balance of water, a binder (e.g., a latex binder and/or a polyurethane binder), and a surfactant. In still further examples, the liquid ink includes the colorant, the hydantoin co-solvent of formula (I) i where n is an integer greater than 2 or of formula (II) where m is an integer equal to or greater than 2, the balance of water, and an additive selected from the group consisting of an antimicrobial agent, a sequestering agent, a viscosity modifier, an anti-kogation agent, and combinations thereof. Suitable amounts for the components of these examples of the liquid ink are discussed further hereinbelow.

In yet another example, the liquid ink may exclude a saccharide. In particular, the liquid ink does not include a saccharide when the hydantoin of formula (I) is used and n is an integer equal to 1 or greater than 2 or when the hydantoin of formula (II) is used and m is an integer equal to or greater than 2. In one example when the liquid ink excludes the saccharide, the ink may include the colorant, the hydantoin co-solvent, and the balance of water. In another example when the liquid ink excludes the saccharide, the ink may include a polyurethane binder in addition to the colorant, the hydantoin co-solvent, and the balance of water. In another example when the liquid ink excludes the saccharide, the ink may include (in addition to the colorant, the hydantoin co-solvent, and the balance of water), a binder, a surfactant, and an additive selected from the group consisting of an antimicrobial agent, a sequestering agent, a viscosity modifier, an anti-kogation agent, and combinations thereof. Examples of the amounts for these examples of the liquid ink are discussed further hereinbelow.

As used herein, the terms "ink vehicle," "liquid vehicle," and "vehicle" may refer to the liquid fluid in which the colorant (e.g., a pigment dispersion) and the binder (e.g., a polyurethane dispersion, a latex, or combinations thereof) are placed to form the liquid ink(s). A wide variety of liquid vehicles may be used with the ink set(s) of the present disclosure. The ink vehicle may include water and the hydantoin, alone or in combination with a variety of additional components. Examples of these additional components may include additional co-solvent(s), surfactant(s), antimicrobial agent(s), a sequestering agent, a viscosity modifier, and/or anti-kogation agent(s).

The ink vehicle includes the hydantoin co-solvent. As mentioned above, the hydantoin has the general formula I:

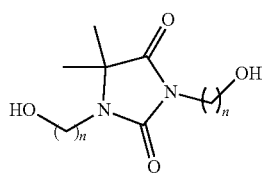

(I)

or the general formula II:

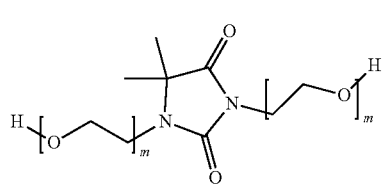

(II)

where n is an integer equal to 1 or greater than 2 and m is an integer equal to or greater than 2. It is to be understood that in some examples of the liquid ink, the hydantoin has the general formula I or the general formula II, where n is an integer greater than 2 and m is an integer equal to or greater than 2. In any of the examples disclosed herein, the hydantoin may be present in an amount ranging from about 0.1 wt % to about 30 wt % (based on the total wt % of the liquid ink).

In an example, the hydantoin of the general formula I, where n is an integer greater than 2, can be formed by reacting hydantoin with an alcohol in the presence of a base according to the following reaction III:

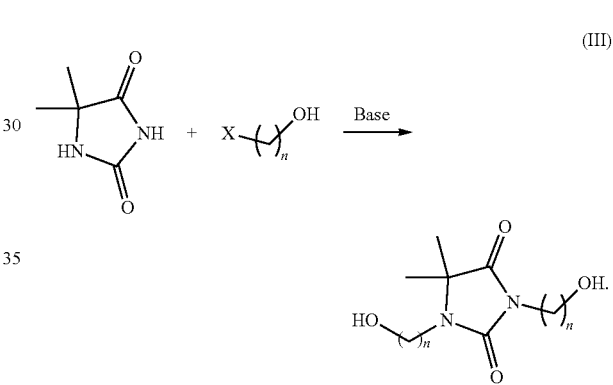

(III)

As mentioned above, n is an integer greater than 2. X may be any leaving group. In an example, X is a halogen group, such as Cl, Br, or I. Other examples of X include trifluoromethanesulfate (-OTF) and p-toluenesulfonate (-PTS). The base may be any common base. Examples of suitable bases include $Na_2CO_3$, $K_2CO_3$, $Cs_2CO_3$, NaOH, and KOH.

In another example, the hydantoin of the general formula I, where n is equal to 1, can be formed by reacting hydantoin with paraformaldehyde in the presence of sodium carbonate according to the following reaction IV:

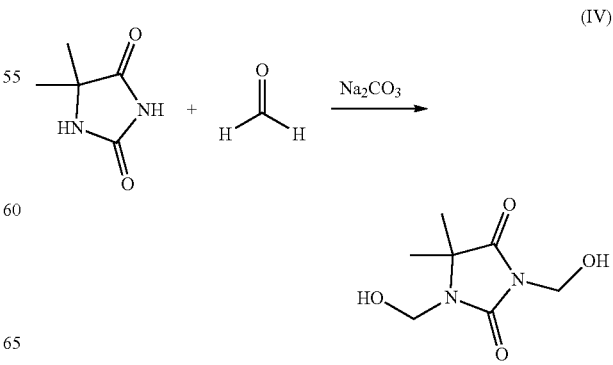

(IV)

to produce 1,3-bis(hydroxymethyl)-5,5-dimethyl hydantoin.

In still another example, the hydantoin of the general formula II, where m is an integer equal to or greater than 2, can be formed by reacting hydantoin with ethylene oxide in the presence of a base and in an autoclave according to the following reaction V:

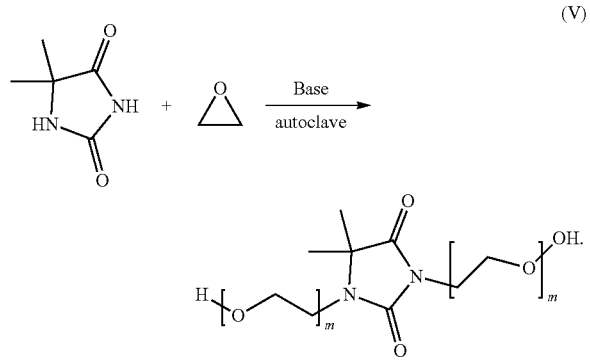

As mentioned above, m is an integer equal to or greater than 2. The value of m may be controlled by the ratio of ethylene oxide to hydantoin. The ratio of ethylene oxide to hydantoin is 2m:1. In an example, to produce the hydantoin of the general formula II, where m is equal to 2, the ratio of ethylene oxide to hydantoin is 4:1. The base may be any common base. Examples of suitable bases include $Na_2CO_3$, $K_2CO_3$, $Cs_2CO_3$, NaOH, and KOH.

The starting hydantoin used in any of reactions III-V may be formed by reacting 2-hydroxy-2-methylpropanenitrile with carbonic acid in the presence of ammonia according to the following reaction VI:

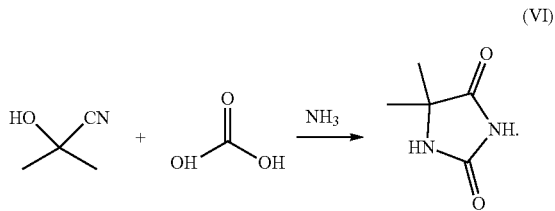

The ink vehicle of any of the examples disclosed herein may also include additional co-solvent(s). When the liquid vehicle includes additional co-solvent(s) as well as the hydantoin, the total amount of the additional co-solvent(s) and the hydantoin present in the liquid ink may range from about 0.1 wt % to about 30 wt % (based on the total wt % of the liquid ink). It is to be understood that other amounts outside of these examples and ranges may also be used.

Examples of additional co-solvents that may be included in the ink vehicle include alcohols, aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, N-alkyl caprolactams, unsubstituted caprolactams, both substituted and unsubstituted formamides, both substituted and unsubstituted acetamides, and the like. Specific examples of alcohols may include ethanol, isopropyl alcohol, butyl alcohol, and benzyl alcohol. Examples of glycol ether co-solvents include glycol alkyl ethers, propylene glycol alkyl ethers, and higher homologs ($C_6$-$C_{12}$) of polyethylene glycol alkyl ethers. Glycol ether co-solvents can have the molecular formula of R'—O—$CH_2CH_2OH$, where R' is a $C_1$-$C_7$ liner, branched, or cyclic alkyl group. In one specific example, the glycol ether can include ethylene glycol monobutyl ether. In other specific examples, the glycol ether can include tripropyleneglycol methyl ether, dipropylene glycol butyl ether, and/or propylene glycol phenyl ether.

The additional co-solvent may also include a polyhydric alcohol or a polyhydric alcohol derivative. Examples of polyhydric alcohols may include ethylene glycol, diethylene glycol, propylene glycol, butylene glycol, triethylene glycol, 1,5-pentanediol, 1,2-hexanediol, 1,2,6-hexanetriol, glycerin, trimethylolpropane, and xylitol. Examples of polyhydric alcohol derivatives may include ethylene glycol monomethyl ether, ethylene glycol mono ethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether, and ethylene oxide adduct of diglycerin.

The additional co-solvent may also include a nitrogen-containing solvent or a sulfur-containing solvent. Examples of nitrogen-containing solvents may include pyrrolidone, N-methyl-2-pyrrolidone, cyclohexylpyrrolidone, and triethanolamine. Examples of sulfur-containing solvents may include thiodiethanol, thiodiglycerol, sulfolane, and dimethyl sulfoxide.

In another example, the additional co-solvent(s) may include a humectant. An example of a suitable humectant is LIPONIC® EG-1 (LEG-1, glycereth-26, available from Lipo Chemicals). Other examples of humectants may include polyols, such as 1,2-hexanediol, 1,3-propanediol, glycerol, tri-ethylene glycol, and combinations. Other humectants can also be used.

The liquid vehicle of the liquid ink may also include surfactant(s). In any of the examples disclosed herein, the surfactant may be present in an amount ranging from about 0.1 wt % to about 20 wt % (based on the total wt % of the liquid ink).

The surfactant may include non-ionic, cationic, and/or anionic surfactants. Examples of the anionic surfactant may include alkylbenzene sulfonate, alkylphenyl sulfonate, alkylnaphthalene sulfonate, higher fatty acid salt, sulfate ester salt of higher fatty acid ester, sulfonate of higher fatty acid ester, sulfate ester salt and sulfonate of higher alcohol ether, higher alkyl sulfosuccinate, polyoxyethylene alkylether carboxylate, polyoxyethylene alkylether sulfate, alkyl phosphate, and polyoxyethylene alkyl ether phosphate. Specific examples of the anionic surfactant may include dodecylbenzenesulfonate, isopropylnaphthalenesulfonate, monobutylphenylphenol monosulfonate, monobutylbiphenyl sulfonate, monobutylbiphenylsulfonate, and dibutylphenylphenol disulfonate. Examples of the nonionic surfactant may include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, polyoxyethylene alkylamine, polyoxyethylene fatty acid amide, alkylalkanolamide, polyethylene glycol polypropylene glycol block copolymer, acetylene glycol, and a polyoxyethylene adduct of acetylene glycol. Specific examples of the nonionic surfactant may include polyoxyethylenenonyl phenylether, polyoxyethyleneoctyl phenylether, or polyoxyethylenedodecyl. Further examples of the nonionic surfactant may include silicon surfactants such as a polysiloxane oxyethylene adduct; fluorine surfactants such as perfluoroalkylcarboxylate, perfluoroalkyl sulfonate, and oxyethyleneperfluoroalkylether; and biosurfactants such as spiculisporic acid, rhamnolipid, and lysolecithin.

In at least some examples, the ink vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOL® 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

In other examples, the surfactant may include an acetylenic surfactant and/or a phosphate surfactant. In an example, the ink vehicle includes the acetylenic surfactant and the acetylenic surfactant is non-ionic. Acetylenic surfactants can include acetylenic diols, alkoxylated acetylenic diols, and other acetylenic surfactants. Some specific examples include 2,7-dimethyl-4-octyn-3,6-diol, 7-tetradecyn-6,9-diol, 2,4,7,9-tetramethyl-5-decyne-4,7-diol, 1,4-dimethyl-1,4-bis(2-methylpropyl)-2-butyne-1,4-diyl ether, ethylene or propylene oxide condensates thereof, or a combination thereof. Some suitable commercially available acetylenic surfactants include SURFYNOL® and DYNOL™ surfactants available from Air Products. In another example, the ink vehicle includes the phosphate surfactant. In some examples, the phosphate surfactant can be a phosphate ester of fatty alcohols or fatty alcohol alkoxylates. In one example, the surfactant can be a mixture of mono- and diesters, and may have an acid number ranging from 50 to 150. In another example, the phosphate-containing surfactant can be of the CRODAFOS family. Specific examples include oleth-3 phosphate, oleth-10 phosphate, oleth-5 phospahte, dioleyl phosphate, ppg-5-ceteth-10 phosphate, $C_9$-$C_{15}$ alkyl monophosphate, deceth-4 phosphate, and mixtures thereof. Other specific examples by tradename include CRODAFOS N3A, CRODAFOS N3E, CRODAFOS N10A, CRODAFOS HCE, CRODAFOS SG, ARLANTONE Map 950, MONOFAX 831, MONOFAS 1214, MONALUBE 215, and ATLOX DP13/6.

In some examples, the liquid vehicle may also include an additive. The additive may be an antimicrobial agent, a sequestering agent, a viscosity modifier, an anti-kogation agent or a combination thereof. In any of the examples including the additive, the additive is present in the liquid ink in an amount ranging from about 0.01 wt % to about 20 wt % (based on the total wt % of the liquid ink).

As mention above, the liquid vehicle may also include antimicrobial agent(s). Suitable antimicrobial agents include biocides and fungicides. Example antimicrobial agents may include the NUOSEPT® (Ashland Inc.), VANCIDE® (R.T. Vanderbilt Co.), ACTICIDE® B20 and ACTICIDE® M20 (Thor Chemicals), and combinations thereof. In any of the examples disclosed herein, the liquid ink may include a total amount of antimicrobial agents that ranges from about 0.1 wt % to about 2.5 wt % (based on the total wt % of the liquid ink). In some instances, the upper end of the range for the antimicrobial agent is 0.25 wt %. In some instances, the antimicrobial agent may be present in the pigment dispersion that is added to the other ink components.

The ink vehicle may also include a sequestering agent. The sequestering agent may be included in any example of the liquid ink disclosed herein to eliminate the deleterious effects of heavy metal impurities. An example of the sequestering agent includes ethylene diamine tetra acetic acid (EDTA). In any of the examples disclosed herein, the liquid ink may include the sequestering agent in an amount that ranges from about 0.01 wt % to about 2 wt % (based on the total wt % of the liquid ink).

The ink vehicle may also include a viscosity modifier. The viscosity modifier may be included to control the viscosity of the liquid ink. In an example, the liquid ink may have a viscosity ranging from about 1.0 cP to about 4.0 cP. Examples of the viscosity modifier include polyvinylpyrrolidone (PVP), polyvinyl alcohol (PVOH), cellulose and functionalized cellulosics, alginates, gums, and the like. In any example disclosed herein, the liquid ink may include the viscosity modifier in an amount that ranges from about 0.01 wt % to about 5.0 wt % (based on the total wt % of the liquid ink).

An anti-kogation agent may also be included in the ink vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3 A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the examples of the liquid ink disclosed herein in an amount ranging from about 0.1 wt % to about 1 wt % of the total wt % of the liquid ink. In some examples, the anti-kogation agent may improve the jettability of the liquid ink.

In some examples disclosed herein, the ink vehicle of the liquid inkjet ink may also include preservative(s), jettability additive(s), and the like.

The liquid ink may be any color, such as black, cyan, magenta, yellow, etc. As such, in addition to the ink vehicle, the liquid ink also includes a colorant. In any of the examples disclosed herein, the colorant is present in the liquid ink in an amount ranging from about 0.5 wt % to about 15 wt % (based on the total wt % of the liquid ink).

In an example, the colorant is an anionically dispersed pigment. In an example, the anionically dispersed pigment is a dispersion including water, the pigment, and an anionic polymer that disperses the pigment (i.e., the anionic polymeric dispersant). In an example, the pigment dispersion may also include, for example, a co-solvent, such as 2-pyrrolidone. The pigment dispersion may be prepared or purchased, and the other components of the ink (e.g., vehicle components) may be slowly added to the pigment dispersion with continuous mixing, to form the ink composition/liquid ink.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® RO100, STANDART® RO200, and DORADO® gold-bronze pigments (available from Eckart Effect Pigments, Wesel, Germany).

The average particle size of the pigments may range anywhere from about 50 nm to about 200 nm. In an example, the average particle size ranges from about 80 nm to about 150 nm.

As mentioned above, in some examples disclosed herein, the pigment may be dispersed by the anionic polymer (i.e., anionic polymeric dispersant). The dispersant may be present in an amount ranging from about 0.1 wt % to about 5 wt % of a total wt % of the liquid ink.

In other examples, the pigment may be a self-dispersing pigment. As used herein, the term "self-dispersing pigment" refers to a pigment having water-solubilizing groups on the pigment surface. The self-dispersing pigment can be dispersed in water without the polymer dispersant. In an example, the self-dispersing pigment is obtained by carrying out surface modification treatments, such as an acid/base treatment, a coupling agent treatment, a polymer graft treatment, a plasma treatment, an oxidation/reduction treatment, on a pigment. Examples of the self-dispersion type pigment may include, in addition to the above described surface modified pigment, commercially available self-dispersion pigments such as CAB-O-JET®-200, CAB-O-JET®-300, CAB-O-JET®-400, IJX-157, IJX-253, IJX-266, IJX-273, IJX-444, IJX-55, CAB-O-JET®-250C, CAB-O-JET®-260M, CAB-O-JET®-270Y, CAB-O-JET®-450C, CAB-O-JET®-465M, CAB-O-JET®-470Y, and CAB-O-JET®-480M manufactured by Cabot Corporation, and Microjet Black CWI, and CW-2 manufactured by Orient Chemical Industries Co., Ltd.

In another example, the colorant is a dye. Examples of dyes include a hydrophilic anionic dye, a direct dye, a cationic dye, a reactive dye, a polymer dye and an oil soluble dye, and a fluorescent dye.

As mentioned above, examples of the liquid ink may also include the binder. In an example, the binder is present in examples of the liquid ink in an amount ranging from about 0.5 wt % to about 15 wt % (based on the total wt % of the liquid ink). Examples of the binder include a latex binder, a polyurethane binder, and combination thereof.

In an example, the binder is the polyurethane binder and is present in a polyurethane dispersion with water. The polyurethane dispersion may be added with the pigment (e.g., pigment dispersion) and the components of the ink vehicle to form the liquid thermal inkjet ink.

Examples of suitable polyurethanes include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a co-polymer thereof, and a combination thereof.

In another example the binder is the latex binder. The latex binder may be a colloidal dispersion of polymer particles in a solvent.

The polymer particles of the latex binder may have several different morphologies. For example, the polymer particles may be made of a hydrophobic core surrounded by a continuous hydrophilic shell. For another example, the polymer particle morphology may resemble a raspberry, in which the hydrophobic core is surrounded by several smaller hydrophilic particles that are attached to the core. For still another example, the polymer particles may include 2, 3, or 4 particles that are at least partially attached to one another.

In the examples disclosed herein, the polymer particles of the latex binder are heteropolymers or co-polymers. The heteropolymers may include a more hydrophobic component and a more hydrophilic component.

Examples of monomers that may be used to form the hydrophobic component include C1 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a hydrophilic monomer, such as an acidic monomer. Examples of acidic monomers that can be polymerized in forming the polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof.

In the heteropolymers disclosed herein, the hydrophobic component(s) make up from about 85% to about 100% of the polymer, and the hydrophilic component(s) make up from about 0.1% to about 15% of the polymer.

In an example, the selected monomer(s) is/are polymerized to form the desirable heteropolymer. Any suitable polymerization process may be used. For example, core-shell (hydrophobic-hydrophilic) polymer particles can be formed by any of a number of techniques, such as: i) grafting a hydrophilic polymer onto the surface of a hydrophobic polymer, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

The polymer particles of the latex binder have a particle size that ranges from about 10 nm to about 300 nm.

The glass transition temperature $T_g$ of the bulk material (e.g., the more hydrophobic portion) of the polymer particles may range from 60° C. to about 100° C. The glass transition temperature $T_g$ of the bulk material may be any temperature that enables the polymer particles to be inkjet printed without becoming too soft at the printer operating temperatures.

The weight average molecular weight of the polymer particles of the latex binder may range from about 5,000 Mw to about 500,000 Mw. In some examples, the weight average molecular weight of the polymer particles ranges from about 100,000 Mw to about 500,000 Mw. In some other examples, the weight average molecular weight of the polymer particles ranges from about 150,000 Mw to 300,000 Mw.

sion) represent, respectively, the total pigment solids and the total polyurethane solids present in the final formulations.

TABLE 1

| Ingredient | Specific Component | Example Ink 1 (wt %) | Comp. Ink 1 (wt %) | Example Ink 2 (wt %) | Comp. Ink 2 (wt %) |
|---|---|---|---|---|---|
| Co-solvent | 1,3-bis(hydroxymethyl)-5,5-dimethyl hydantoin | 8 | 0 | 8 | 0 |
| | 1,3-bis(2-hydroxyethyl)-5,5-dimethylhydantoin | 0 | 8 | 0 | 8 |
| Additional Co-solvent | 1-(2-hydroxyethyl)-2-pyrrolidone | 1.5 | 1.5 | 1.5 | 1.5 |
| Binder | PU dispersion | 0.75 | 0.75 | 0.75 | 0.75 |
| Surfactant | SURFYNOL ® SE-F | 0.68 | 0.68 | 0.52 | 0.52 |
| Additive | LEG-1 | 0 | 0 | 1.00 | 1.00 |
| | Crodafos N-3 Acid | 0.50 | 0.50 | 1.0 | 1.0 |
| Biocide | Acticide B20 | 0.18 | 0.18 | 0.18 | 0.18 |
| | Acticide M20 | 0.07 | 0.07 | 0.07 | 0.07 |
| Colorant | Black pigment dispersion | 2.5 | 2.5 | 0 | 0 |
| | Cyan pigment dispersion | 0 | 0 | 2.25 | 2.25 |
| Water | | Balance | Balance | Balance | Balance |

The liquid ink disclosed herein may have a pH ranging from about 7 to about 10. A slight excess of the metal hydroxide base (e.g., NaOH, KOH, etc.) may be added to counteract any slight pH drop that may occur over time.

Some examples of the liquid ink have an image quality performance, a durability performance, a jettability performance, and/or a stability performance that are comparable to or better than an image quality performance, a durability performance, a jettability performance, and/or a stability performance of a comparable ink. The comparable ink may have the same components in the same amounts as the liquid ink, but includes 1,3-bis(2-hydroxyethyl)-5,5-dimethylhydantoin instead of the hydantoin having the general formula I or the general formula II. As mentioned above, image quality performance may be measured in terms of the optical density, coalescence, and gloss of a printed image; durability performance may be measured in terms of the mechability and abrasion resistance of a printed image; jettability performance can be measured in terms of decap performance, missing nozzle percentage, drop weight, and drop velocity; and stability performance can be measured in terms of pH stability and physical stability.

To further illustrate the present disclosure, an example is given herein. It is to be understood that this example is provided for illustrative purposes and is not to be construed as limiting the scope of the present disclosure.

EXAMPLE

Two examples of the liquid inkjet ink were prepared with 1,3-bis(hydroxymethyl)-5,5-dimethylhydantoin as the hydantoin. Two comparative inks were also prepared. The comparative inks contained 1,3-bis(2-hydroxyethyl)-5,5-dimethylhydantoin rather than the hydantoin disclosed herein. The example and comparative ink compositions were prepared with either a black pigment (present in a dispersion with water and a styrene acrylate dispersant) or a cyan pigment (present in a dispersion with water and a styrene acrylate dispersant). The general formulation of the example and comparative ink compositions are shown in Table 1, with the wt % of each component that was used. The weight percentages of the styrene acrylate pigment dispersion (labeled black pigment dispersion and cyan pigment dispersion) and the polyurethane dispersion (labeled PU dispersion) represent, respectively, the total pigment solids and the total polyurethane solids present in the final formulations.

Each example and comparative ink was tested for image quality performance. Each example and comparative ink was printed on a Graph+coated substrate and an uncoated white top (UWT) substrate. The optical density (OD) was measured for each of the printed images. Coalescence and 75° gloss measurements were taken of the images printed on the Graph+substrate. The results of the optical density (OD), coalescence, and 75° gloss measurements are shown below in Table 2.

TABLE 2

| Ink | OD Graph+ | OD UWT | Coalescence Graph+ | 75° Gloss Graph+ |
|---|---|---|---|---|
| Ink 1 | 1.45 | 1.31 | 3.90 | 67.80 |
| Comp. Ink 1 | 1.45 | 1.38 | 3.90 | 60.60 |
| Ink 2 | 1.22 | 1.05 | 1.61 | 62.70 |
| Comp. Ink 2 | 1.19 | 1.03 | 1.75 | 59.50 |

As shown in Table 2, the example inks including an example of the hydantoin disclosed herein (inks 1 and 2) have optical density (on both the Graph+ substrate and the UWT substrate) and coalescence measurements that are comparable to the optical density and coalescence measurements of the ink formulations including 1,3-bis(2-hydroxyethyl)-5,5-dimethylhydantoin (comp. inks 1 and 2) instead of an example of the hydantoin disclosed herein. Also shown in Table 2 is that the example inks including an example of the hydantoin disclosed herein (inks 1 and 2) have an increased 75° gloss when compared to comp. inks 1 and 2.

Thus, the example inks including an example of the hydantoin disclosed herein (inks 1 and 2) have image quality performances that are comparable to or better than the image quality performances of the comparative inks 1 and 2 with the same ink formulation but including 1,3-bis(2-hydroxyethyl)-5,5-dimethylhydantoin instead of an example of the hydantoin disclosed herein.

Each example and comparative ink was also tested for durability performance. Each example and comparative ink was again printed on the Graph+substrate and the UWT substrate. The mechability was taken of the images printed on the Graph+substrate by rolling a metal roller at a temperature of about 100° C. across the print. The damage to each print was graded visually using a scale of 1-5, with 5 indicating no damage seen and 1 indicating severe damage to the ink film with patches of complete ink removal and bare media visible. Each print was tested for abrasion resistance. To test for abrasion resistance, a print of each example and comparative ink on both the Graph+substrate and the UWT substrate was rubbed 200 times with a rub tester. Additionally, a print of each example and comparative ink on both the Graph+substrate and the UWT substrate was also rubbed with 5 times with the rub tester at 250° C. The damage to each print was graded visually using a scale of 1-5, with 5 indicating no damage seen and 1 indicating that the ink film was scrapped off completely. The results of the mechability and abrasion resistance tests for each print are shown below in Table 3.

TABLE 3

| Ink | Mechability Graph+ | 200-cycle Graph+ | 250° C. Heated Graph+ | 200-cycle UWT | 250° C. Heated UWT |
|---|---|---|---|---|---|
| Ink 1 | 4.0 | 3 | 3 | 4 | 5 |
| Comp. Ink 1 | 4.0 | 1 | 3 | 1 | 5 |
| Ink 2 | 5.0 | 1 | 5 | 4 | 5 |
| Comp. Ink 2 | 4.0 | 1 | 4 | 4 | 5 |

As shown in Table 3, the example inks including an example of the hydantoin disclosed herein (inks 1 and 2) have mechability and abrasion resistance (on both the Graph+substrate and the UWT substrate) measurements that are comparable to the mechability and abrasion resistance measurements of the comp. inks 1 and 2, respectively. Also shown in Table 3 is that one of the example inks including an example of the hydantoin disclosed herein (ink 1) has an improved abrasion resistance (on both the Graph+substrate and the UWT substrate), as measured by the 200-cycle test, when compared to the comparative ink 1, which had the same ink formulation but includes 1,3-bis(2-hydroxyethyl)-5,5-dimethylhydantoin instead of an example of the hydantoin disclosed herein.

Thus, the example inks including an example of the hydantoin disclosed herein (inks 1 and 2) have durability performances that are comparable to or better than the durability performances of the comparative inks with the same ink formulation but including 1,3-bis(2-hydroxyethyl)-5,5-dimethylhydantoin instead of an example of the hydantoin disclosed herein (comp. inks 1 and 2, respectively).

Each example and comparative ink was also tested for jettability performance. To test for jettability performance, decap time, steady-state drop weight, high-frequency drop weight, drop velocity, and missing nozzles percentage, were measured.

An ink's decap can be measured by printing a warmup line, then waiting (not firing) for a set amount of time (wait time), and then printing a $2^{nd}$ line. The visual quality of this $2^{nd}$ line is graded to be either "good" or "bad", according to a set of visual grading standards. This process is then repeated, using increasing wait times (e.g., wait times may range from 0.01 seconds to 10 seconds). Typically, as the wait time increases, the quality of the $2^{nd}$ line degrades. In this case, the reported decap time is the longest wait time after which the $2^{nd}$ printed line is still considered good.

Drop weight can be measured by firing a known number of ink drops into a weighing pan that can be used to calculate the theoretical average drop weight. The steady-state drop weight was calculated by averaging the drop weights measured at ejection frequencies ranging from 0 kHz to 6 kHz. The high frequency drop weight was measured at a high ejection frequency of 29 kHz. Drop velocity can be measured by using lasers to track the movement of ink drops as they are jetted through the air from the printhead.

The missing nozzles percentage, for each example and comparative ink, was calculated by determining the percentage of nozzles that did not fire during the drop velocity test.

The results of the decap time, missing nozzles percentage, steady-state drop weight, high-frequency drop weight, and drop velocity measurements are shown below in Table 4.

TABLE 4

| Ink | Decap time (s) | Missing Nozzles (%) | Steady-State Drop weight (ng) | High-Frequency Drop Weight (ng) | Drop velocity (m/s) |
|---|---|---|---|---|---|
| Ink 1 | 0.30 | 0 | 9.5 | 10.4 | 12.6 |
| Comp. Ink 1 | 0.30 | 0 | 9.3 | 9.1 | 12.9 |
| Ink 2 | 0.20 | 8 | 6.6 | 7.7 | 11.2 |
| Comp. Ink 2 | 0.30 | 2 | 6.4 | 6.0 | 12.0 |

As shown in Table 4, the example inks including an example of the hydantoin disclosed herein (inks 1 and 2) have decap time, missing nozzles percentage, steady-state drop weight, and drop velocity measurements that are comparable to the decap time, missing nozzles percentage, steady-state drop weight, and drop velocity measurements of the same ink formulation but including 1,3-bis(2-hydroxyethyl)-5,5-dimethylhydantoin instead of an example of the hydantoin disclosed herein (comp. inks 1 and 2, respectively). Also shown in Table 4 is that the example inks including an example of the hydantoin disclosed herein (inks 1 and 2) have an increased high-frequency drop weight when compared to the comparative inks with the same ink formulation but including 1,3-bis(2-hydroxyethyl)-5,5-dimethylhydantoin (comp. inks 1 and 2, respectively) instead of an example of the hydantoin disclosed herein.

Thus, the example inks including an example of the hydantoin disclosed herein (inks 1 and 2) have jettability performances that are comparable to or better than the jettability performances of the comparative inks with the same ink formulation but including 1,3-bis(2-hydroxyethyl)-5,5-dimethylhydantoin instead of an example of the hydantoin disclosed herein (comp. inks 1 and 2, respectively).

Each example and comparative ink was also tested for stability. Each example and comparative ink was stored in an accelerated storage (AS) environment at a temperature of 60° C. for one week. The pH and particle size for each example and comparative ink were measured before and after the ink formulations were stored in the AS environment. The particle size (volume-weighted mean diameter) was determined via dynamic light scattering with a Malvern particle size analyzer. Then the pH change (i.e., the difference between before and after) and the percent change in particle size were calculated for each example and comparative ink. Additionally, each example and comparative ink was put through a T-cycle. During the T-cycle, each ink was heated to and maintained at a high temperature of 70° C. for a few minutes, and then each ink was cooled to and maintained at a low temperature of −40° C. for a few minutes. This process was repeated for each ink for 5 cycles. For each example and comparative ink, the particle size was measured before and after the T-cycle, and the percent change in particle size was calculated. The results of the pH change and particle size change calculations are shown below in Table 5.

TABLE 5

| Ink | pH change after 1 wk ASL | Particle size change after 1 wk ASL (%) | Particle size change after T-cycle (%) |
|---|---|---|---|
| Ink 1 | −0.08 | −1 | 1 |
| Comp. Ink 1 | −0.19 | 0 | 1 |
| Ink 2 | −0.04 | 3 | 3 |
| Comp. Ink 2 | −0.24 | −2 | −1 |

As shown in Table 5, the example inks including an example of the hydantoin disclosed herein (inks 1 and 2) have particle size changes (after both AS and T-cycle) that are comparable to the particle size changes of the comparative inks with the same ink formulation but including 1,3-bis(2-hydroxyethyl)-5,5-dimethylhydantoin instead of an example of the hydantoin disclosed herein (comp. inks 1 and 2, respectively). Also shown in Table 5 is that the example inks including an example of the hydantoin disclosed herein (inks 1 and 2) exhibit less of a pH change when compared to corresponding comparative inks (i.e., comp. inks 1 and 2, respectively).

Thus, the example inks including an example of the hydantoin disclosed herein (inks 1 and 2) have stability performances that are comparable to or better than the stability performances of the comparative inks with the same ink formulation but including 1,3-bis(2-hydroxyethyl)-5,5-dimethylhydantoin instead of an example of the hydantoin disclosed herein (comp. inks 1 and 2, respectively).

Turn On Energy (TOE) curves were measured for each example and comparative ink. The TOE curves are shown in FIG. 1. The drop weight values (ng) are along the Y axis and electrical energy values (µJ) are along the X axis. As shown in FIG. 1, the example inks including an example of the hydantoin disclosed herein (inks 1 and 2) have TOE curves that are comparable to the TOE curves of the same ink formulation but including 1,3-bis(2-hydroxyethyl)-5,5-dimethylhydantoin instead of an example of the hydantoin disclosed herein (comp. inks 1 and 2, respectively).

Figure 2:
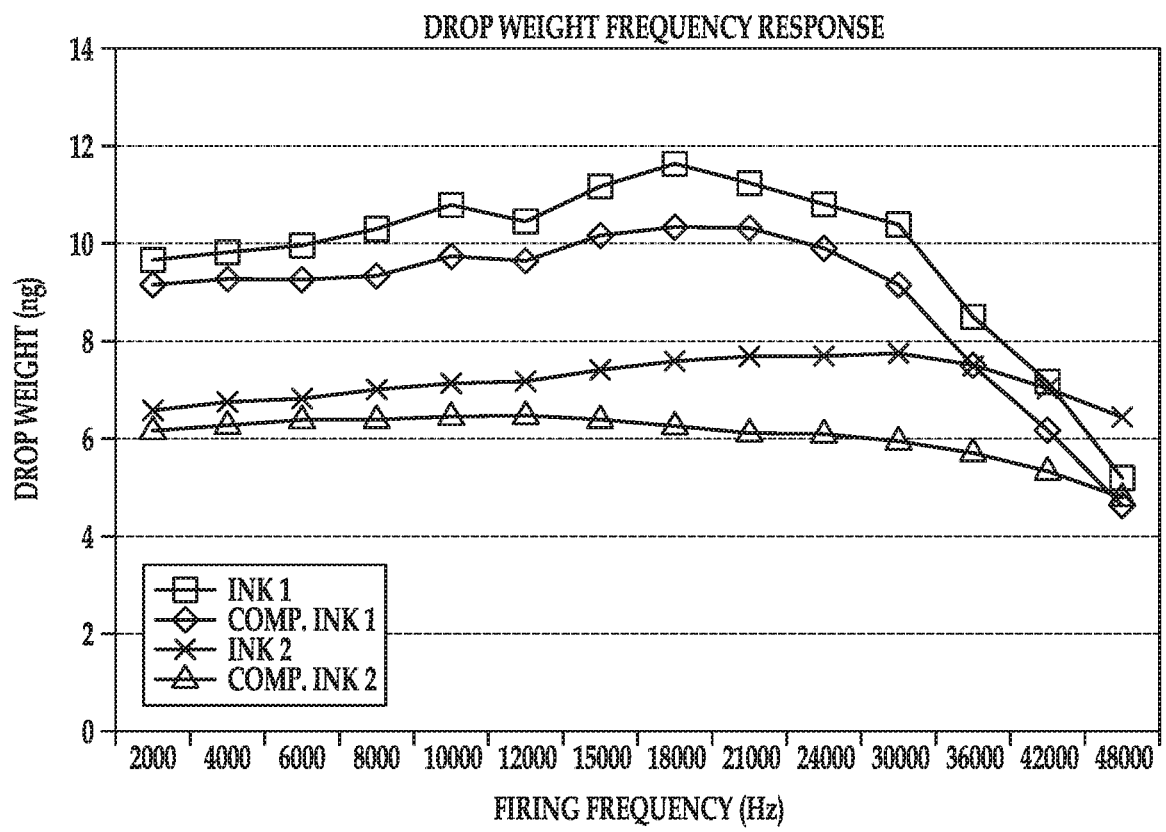
FIG. 2 is a drop weight frequency response graph illustrating the effect of increasing firing frequency (Hz, X axis) on ink drop weight (ng, Y axis) for examples of the liquid ink disclosed herein and comparative inks.

Drop weight frequency response curves were also measured for each example and comparative ink. The drop weight frequency response curves are shown in FIG. 2. The drop weight values (ng) are along the Y axis and the firing frequency values (Hz) are along the X axis. As shown in FIG. 2, the example inks including an example of the hydantoin disclosed herein (inks 1 and 2) have improved frequency responses when compared to the comparative inks with the same ink formulation but including 1,3-bis(2-hydroxyethyl)-5,5-dimethylhydantoin instead of an example of the hydantoin disclosed herein (comp. inks 1 and 2, respectively).

It is to be understood that the ranges provided herein include the stated range and any value or sub-range within the stated range. For example, a range from about 0.1 wt % to about 30 wt % should be interpreted to include not only the explicitly recited limits of from about 0.1 wt % to about 30 wt %, but also to include individual values, such as 0.35 wt %, 5.5 wt %, 17.75 wt %, 28.85 wt %, etc., and sub-ranges, such as from about 0.35 wt % to about 16.5 wt %, from about 0.5 wt % to about 27.7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A liquid ink, comprising:
   a colorant;
   a co-solvent including a hydantoin having a general formula I

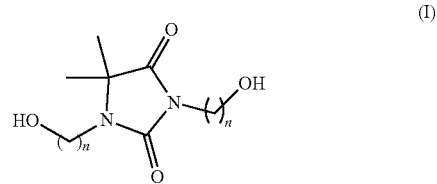

or a general formula II

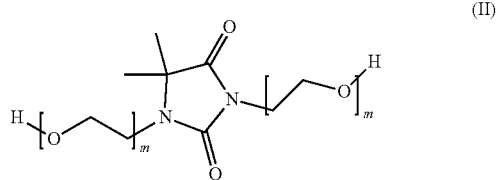

wherein n is an integer greater than 2 and m is an integer equal to or greater than 2;
a binder consisting of a latex, wherein the latex is a heteropolymer including a hydrophobic component and a hydrophilic component;
a monomer making up the hydrophobic component is selected from the group consisting of methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexyl methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes, vinyl chloride, vinylidene chloride, vinylbenzyl chloride, acrylonitrile, methacrylonitrile, N-vinyl imidazole, N-vinylcarbazole, N-vinylcaprolactam, and combinations thereof; and a monomer making up the hydrophilic component is selected from the group consisting of acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, and combinations thereof; and a balance of water.

2. The liquid ink as defined in claim 1 wherein:
the colorant is present in the liquid ink in an amount ranging from about 0.5 wt % to about 15 wt %; and
the co-solvent is present in the liquid ink in an amount ranging from about 0.1 wt % to about 30 wt %.

3. The liquid ink as defined in claim 1, further comprising a surfactant.

4. The liquid ink as defined in claim 3 wherein:
the binder is present in the liquid ink in an amount ranging from about 0.5 wt % to about 15 wt %; and
the surfactant is present in the liquid ink in an amount ranging from about 0.1 wt % to about 20 wt %.

5. The liquid ink as defined in claim 1, further comprising an additive selected from the group consisting of an antimicrobial agent, a sequestering agent, a viscosity modifier, an anti-kogation agent, and combinations thereof.

6. The liquid ink as defined in claim 5 wherein the additive is present in the liquid ink in an amount ranging from about 0.01 wt % to about 20 wt %.

7. The liquid ink as defined in claim 1 wherein the liquid ink excludes a saccharide.

8. A liquid ink, consisting of:
a colorant;
a co-solvent including a hydantoin having a general formula I

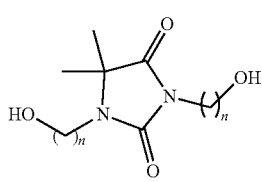

(I)

or a general formula II

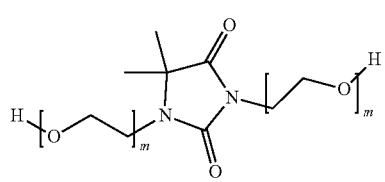

(II)

wherein n is an integer equal to 1 or greater than 2 and m is an integer equal to or greater than 2;
a binder wherein;
the latex binder is a heteropolymer including a hydrophobic component and a hydrophilic component;
a monomer making up the hydrophobic component is selected from the group consisting of methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexyl methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes, vinyl chloride, vinylidene chloride, vinylbenzyl chloride, acrylonitrile, methacrylonitrile, N-vinyl imidazole, N-vinylcarbazole, N-vinylcaprolactam, and combinations thereof; and
a monomer making up the hydrophilic component is selected from the group consisting of acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, and combinations thereof;

a surfactant;

an additive selected from the group consisting of an antimicrobial agent, a sequestering agent, a viscosity modifier, anti-kogation agent, and combinations thereof; and a balance of water.

9. The liquid ink as defined in claim 8 wherein:

the colorant is present in the liquid ink in an amount ranging from about 0.5 wt % to about 15 wt %;

the co-solvent is present in the liquid ink in an amount ranging from about 0.1 wt % to about 30 wt %;

the latex binder is present in the liquid ink in an amount ranging from about 0.5 wt % to about 15 wt %;

the surfactant is present in the liquid ink in an amount ranging from about 0.1 wt % to about 20 wt %; and the additive is present in the liquid ink in an amount ranging from about 0.01 wt % to about 20 wt %.

10. The liquid ink as defined in claim 1 wherein the hydrophobic component makes up from about 85% to about 100% of the heteropolymer, and the hydrophilic component makes up from about 0.1% to about 15% of the heteropolymer.

\* \* \* \* \*